United States Patent [19]
Ota et al.

[11] Patent Number: 5,410,633
[45] Date of Patent: Apr. 25, 1995

[54] GRADE CALCULATING CIRCUIT FOR FUZZY INFERENCE

[75] Inventors: Ken Ota, Yokohama, Japan; William C. Archibald, Austin; Robert W. Sparks, Kyle, both of Tex.

[73] Assignee: Motorola, Inc., Schaumburg, Ill.

[21] Appl. No.: 126,867

[22] Filed: Sep. 27, 1993

[30] Foreign Application Priority Data

Sep. 29, 1992 [JP] Japan .................. 4-283935

[51] Int. Cl.⁶ .......................... G06G 7/00
[52] U.S. Cl. .......................... 395/3; 395/51; 395/900
[58] Field of Search ............. 395/3, 11, 900, 51

[56] References Cited

U.S. PATENT DOCUMENTS

| | | | |
|---|---|---|---|
| 4,837,725 | 6/1989 | Yamakawa | 395/3 |
| 4,875,184 | 10/1989 | Yamakawa | 395/900 |
| 5,040,215 | 8/1991 | Amano et al. | 381/43 |
| 5,179,629 | 1/1993 | Nakamura | 395/3 |
| 5,189,728 | 2/1993 | Yamakawa et al. | 395/51 |
| 5,202,954 | 4/1993 | Miyazawa et al. | 395/3 |
| 5,222,191 | 6/1993 | Enomoto | 395/3 |
| 5,259,063 | 11/1993 | Salazar | 395/3 |

OTHER PUBLICATIONS

A Multiplier Chip with multiple-valued Bidirectional Current-mode Logic Circuits. M. Kameyama Apr. 30, 1988.
Fuzzy multiple-Input Max and Min circuits in current mode and their analyses using bounded difference equations M. Sasaki Jun. 1990 IEEE.
Fast Digital Fuzzy Operation Units Using Comparison Look-Ahead Han et al IEEE, 12-14 Aug. 1990 pp. 870-873.

*Primary Examiner*—Allen R. MacDonald
*Assistant Examiner*—Richemond Dorvil

[57] ABSTRACT

A grade calculating circuit (FIG. 1) used for fuzzy inference computation is disclosed. The circuit calculates input label grades based on the relationships between input data (Xi) and the input labels, defined by membership functions (MF) having at least one inclined line segment (FIG. 3), said grades having the upper and lower limit values ($g_{max}$, $g_{min}$). The circuit comprises: memory (20) for memorizing the input label membership functions by storing, for each of the membership functions, a function form type code, a bending point (Xo) at an end of the inclined line segment and a multiplication rule which designates a multiplier ($2^n + 2^m$) proportional to the inclination of the inclined line segment; a horizontal distance calculating circuit (40) for calculating a horizontal distance (Xi - Xo) between an input datum (Xi) and the bending point (Xo) for said each of the membership functions; a multiplication circuit (50) for performing operation according to said multiplication rule on said horizontal distance, to provide a grade value determined by the inclined line segment with respect to the horizontal distance; and a selecting circuit (60) for selecting one value as an input label grade, from the grade value provided by the multiplication circuit, the upper limit grade value of the membership function and the lower limit grade value of the membership function.

4 Claims, 4 Drawing Sheets

Δ TYPE

Z TYPE

π TYPE

Z TYPE

S TYPE

GRADE CALCULATING CIRCUIT FOR FUZZY INFERENCE

FIELD OF THE INVENTION

The present invention, in general, to a fuzzy inference system which is utilized for controlling various consumer electronics, automobiles and the like. More particularly, the invention relates to a grade calculating circuit used in the fuzzy inference system. Such grade calculating circuit calculates grades of input labels based on relationships between input data and the membership functions.

BACKGROUND OF THE INVENTION

It is well known in the art to widely use fuzzy logic control based on fuzzy inference in controlling various consumer electronics, household appliances, automobiles, cameras and the like. In the fuzzy control, in general, if fuzzy conception or fuzzy condition "A" holds well, then control "X" is executed. This proposition is represented by a fuzzy rule "if A then X". More specifically, control "X" is executed in a degree determined by how well a fact indicated by input data conforms to fuzzy conception "A". In this fuzzy rule, A is referred to as "antecedent" and X as "consequent". The degree of conformity of the fact to fuzzy conception A is called "grade". The grade is a function of input data. Therefore, it is necessary to calculate such grade with regard to each fuzzy conception. An input label is used for identifying each input fuzzy conception or condition. Accordingly a fuzzy conception is referred to also as an input label. An input label membership function defines the relationship between input data and an input label, and is stored in an MF-ROM. As shown in FIG. 5, a grade calculating circuit is provided in the fuzzy inference system, which calculates input label grades (gi) based on input data (Xi) and input label membership functions. The calculated grades are supplied to a min-max computing circuit, where output label grades are computed and then supplied to defuzzification circuit. The final output data are provided from the defuzzification circuit.

In the fuzzy inference system mentioned above, multiple input channels are provided to receive multiple input data such as velocity, pressure and temperature. And multiple input labels are defined in each of the input channels. The system also has multiple output channels to produce multiple output data such as on/off switch signal and valve control signal. And multiple output labels are also defined in each of the output channels. Therefore the total number of the input label grades, each of which needs calculation, becomes significantly large, being equal to the number of input channels times the number of input labels per input channel.

A membership function for each of the input labels is previously stored in MF-ROM. A grade calculating circuit is provided in the fuzzy inference system, which calculates input label grades (gi) based on input data (Xi) and input label membership functions. The membership functions may take the forms as Δ type, Z type, S type and π type, each consisting of flat line portions and inclined line portions. For example, a Δ type function consists of flat portions having the lower limit grade $g_{min}$, and inclined line portions as shown in FIG. 4A. In FIG. 4A, $$g_i = \frac{x_i - x_0}{x_i - x_0}.$$

In FIG. 4B, a Z type function, $$g_i = \frac{x_1 - x_i}{x_1 - x_0}.$$

In FIG. 4C, a π type function, $$g_i = \frac{x_1 - x_i}{x_1 - x_0}.$$

Prior art grade calculating circuit judges the magnitude relationship between input data (Xi) and a plurality of bending points (X0, X1, X2, X3). Depending on the judgment, interpolation calculations such as (Xi-X0)/(X1-X0) are performed. In order to perform the judgment on magnitude relationships, it was necessary to prepare memory area for storing all four bending points for each of the input membership functions. In order to perform the interpolation calculations, it was necessary to prepare memory area for storing two inclinations. Therefore, a large 6 byte data field was needed in total for each of the membership functions. However, memory size is required to be as small as possible.

Prior art fuzzy control systems have been used mainly in low speed control applications such as home appliances. However, when fuzzy control systems are desired to be used in high speed and relatively complicated control applications such as cruise controls or suspension control of vehicles and the like, computing speed should be significantly improved to typically 1000 times faster than the conventional one. The improvement of the computation speed is achieved by synergistically tuning three computation stages: the grade calculations of input labels, the min-max operations performed on the input label grades to obtain output label grades, and the calculations of center of gravity of output label's membership functions.

Even in a relatively small 8-bit circuit, the division of (Xi-X0)/(X1-X0) typically needs at least 8–10 clock cycles, which is an obstacle to speed up grade calculating circuit. If 6 byte data are processed in parallel in order to reduce the operation time, a large number of hardwares such registers, comparators or logic circuits should be arranged, resulting too much of hardwares.

SUMMARY OF THE INVENTION

Accordingly, it is an object of the present invention is to provide an improved grade calculating circuit for fuzzy inference system.

More particularly, it is an object of the present invention to provide such an grade calculating circuit which can perform grade calculation very fast without increasing memory capacitance or hardware amount.

These and other objects and advantages of the present invention are provided by a grade calculating circuit (FIG. 1) used for fuzzy inference computation, for calculating grades of input labels based on the relationships between input data (Xi) and the input labels, defined by membership functions (MF) having at least one inclined line segment(FIG. 3), said grades having the upper and lower limit values ($g_{max}$, $g_{min}$), comprising: memory means (20) for memorizing the input label membership functions by storing, for each of the membership functions, a function form type code, a bending point (Xo) at an end of the inclined line segment and a multiplication rule which designates a multiplier $(2^n + 2^m)$ proportional to the inclination of the inclined line segment; a horizontal distance calculating circuit (40) for calculating a horizontal distance (Xi-Xo) between an input datum (Xi) and the bending point (Xo) for said each of the membership functions; a multiplication circuit (50) for performing operation according to said multiplication rule on said horizontal distance, to provide a grade value determined by the inclined line segment with respect to the horizontal distance; and a selecting circuit (60) for selecting one value as an input label grade, from the grade value provided by the multiplication circuit, the upper limit grade value of the membership function and the lower limit grade value of the membership function.

These and other objects and advantages of the present invention will be apparent from the detailed description below taken together with the drawings.

DETAILED DESCRIPTION OF THE INVENTION

Figure 1:
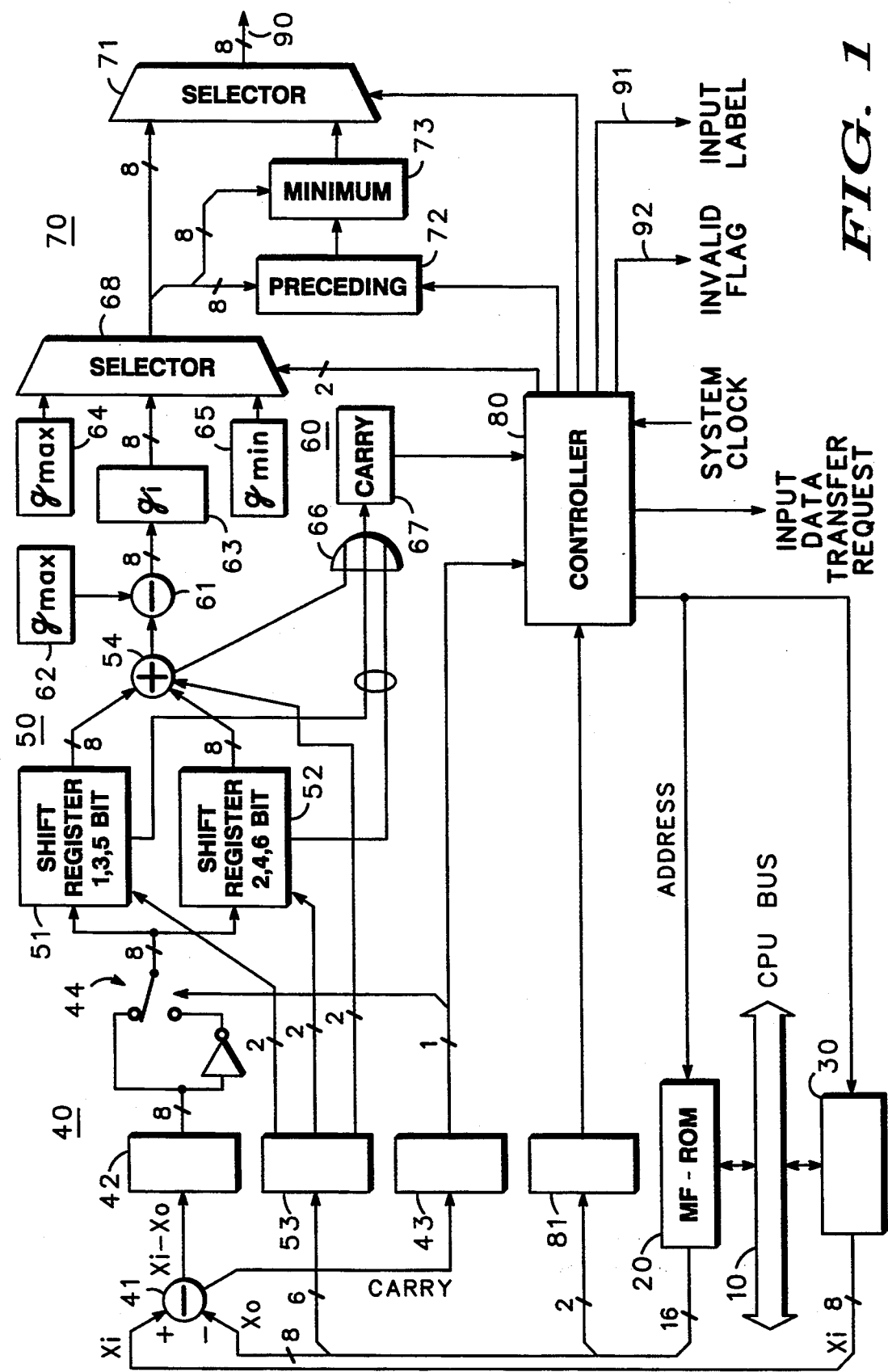
FIG. 1 is a block diagram of a grade calculating circuit according to a preferred embodiment of the present invention.

FIG. 1 is a block diagram of a grade calculating circuit according to a preferred embodiment of the present invention. The grade calculating circuit includes a CPU bus 10, an MF-ROM 20, an input data register 30, a distance calculating circuit 40, a distance multiplication circuit 50, an output selection circuit 60, a minimum value selection circuit 70, a controller 80 and a grade bus 90 which outputs calculation results to a min-max computing circuit (not shown). Controller 80 supplies timing signals and control signals to each of the above circuits to control their operations.

Figure 2:
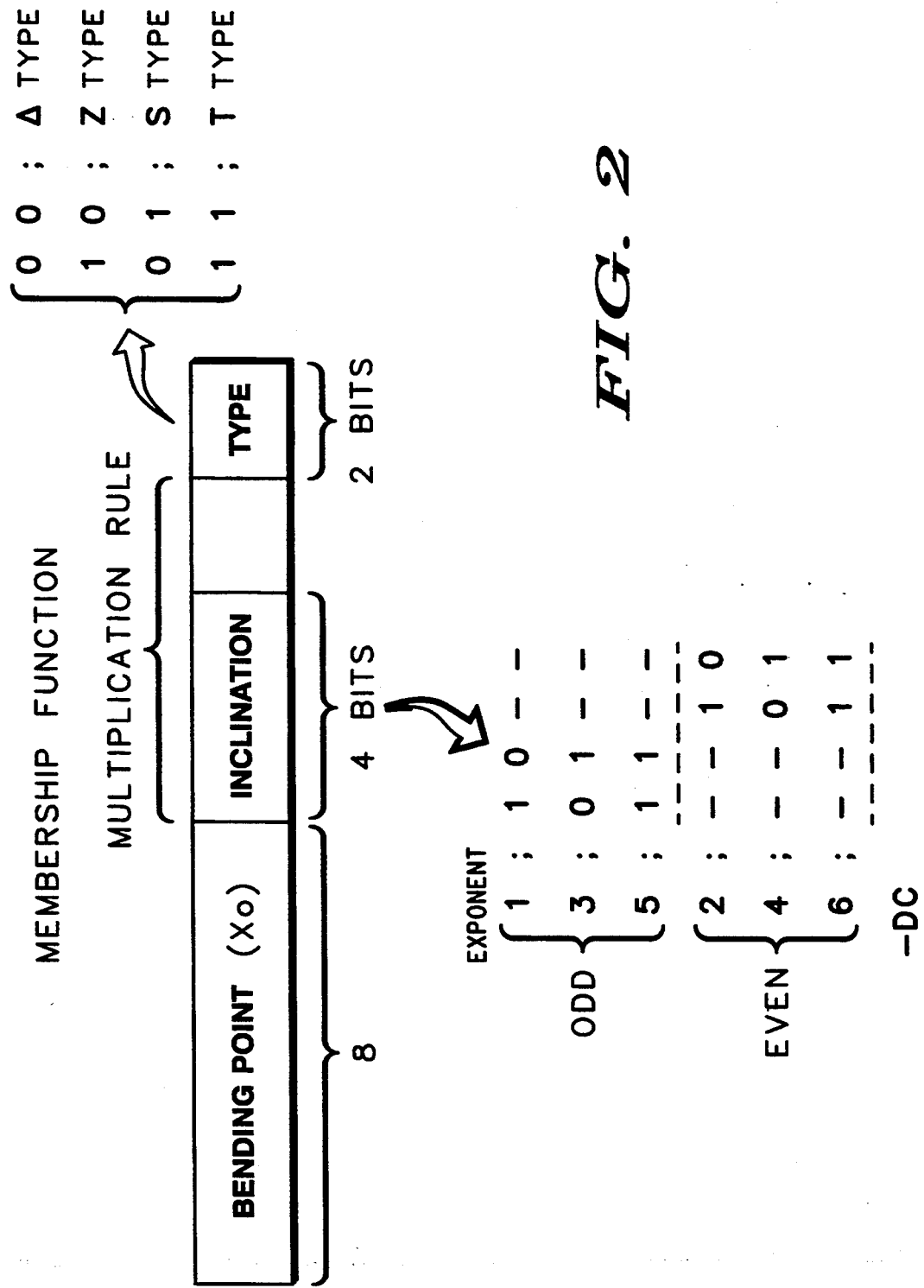
FIG. 2 illustrates an example of data structure of membership functions stored in MF-ROM shown in FIG. 1.

According to a preferred embodiment, membership functions stored in MF-ROM 20 have a 2-byte width structure shown in FIG. 2. Each of the membership functions includes an 8-bit bending point field, 6-bit multiplication rule field and 2-bit type field. 2-bit function type codes (00), (10), (01) and (11) in the type field define 4 types of membership functions, $\Delta$, S, Z and $\pi$. An 8-bit (one word) datum in bending point field defines the position of the only one bending position of each membership function. Each of the $\Delta$ function, S function and Z function has the only bending position.

Figure 3A:
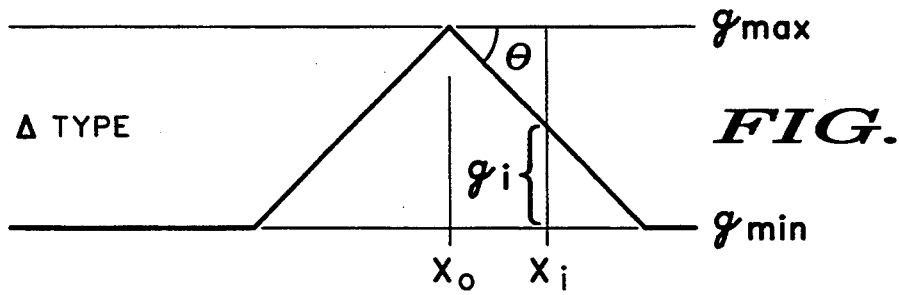
FIG. 3 shows a preferred embodiment of membership functions to illustrate grade calculating method according to the invention.
Figure 3B:
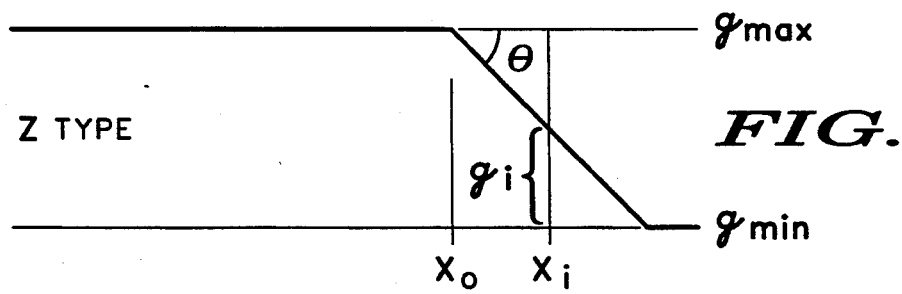
Figure 3C:
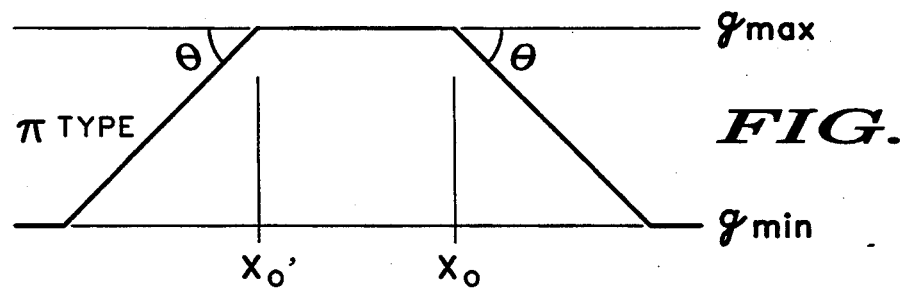
Figure 3D:
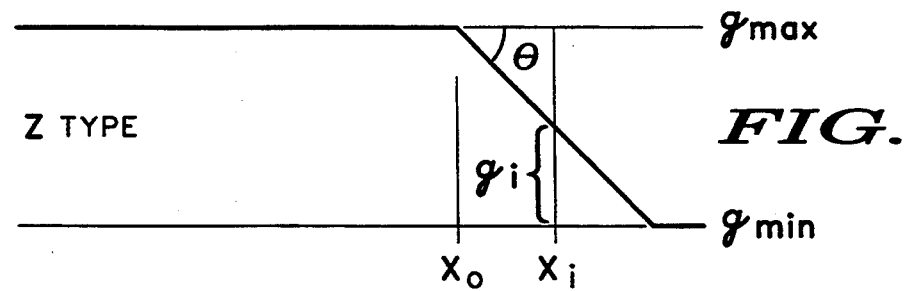
Figure 3E:
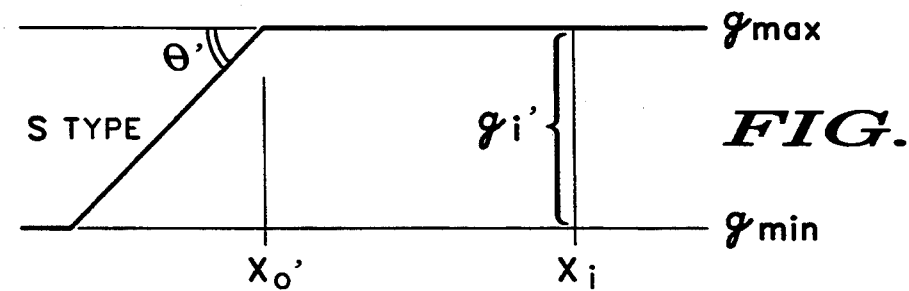
Figure 4A:
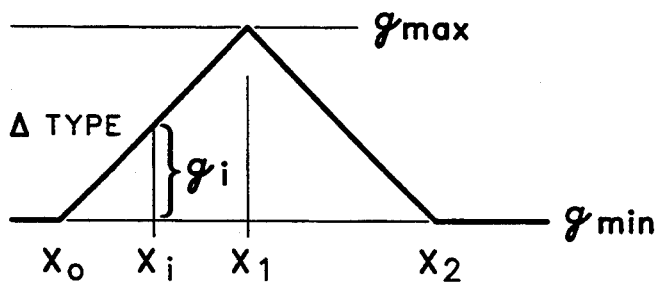
FIG. 4 shows a prior art membership functions and grade calculating method.
Figure 4B:
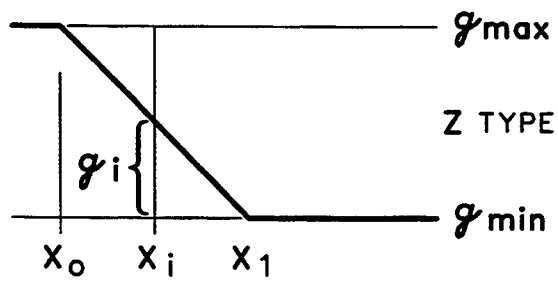
Figure 4C:
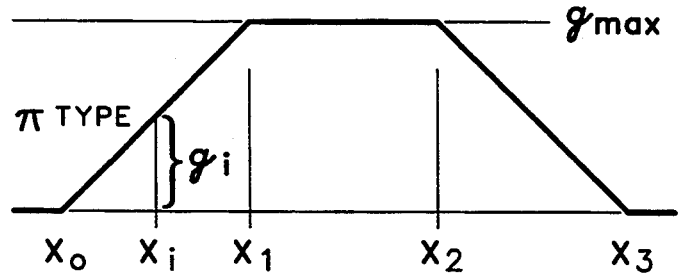
Figure 5:
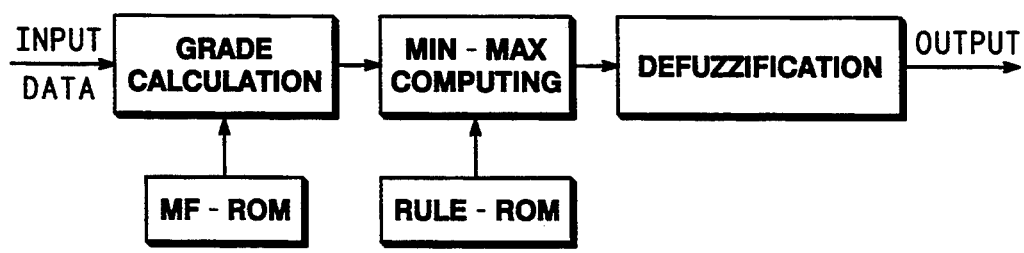
FIG. 5 shows an outline of a fuzzy inference system to illustrate a role of a grade calculation circuit in the system.

The $\pi$ function may be defined by a combination of Z function and S function as shown in FIG. 3(C)-(E). That is, the $\pi$ type membership function is defined with two word data representing Z function having the only bending point Xo and X function having the only bending point Xo'. As for grade calculating, a grade $g_i$ is first calculated based on the preceding Z function, and then a grade $g_i'$ is calculated based on the S function. Either smaller one of the grade $g_i$ or $g_i'$ is adopted as the final grade of the $\pi$ function. A special process for the grade calculation of the $\pi$ function will be described later in detail.

A grade calculation for the $\Delta$, S and Z functions according to the embodiment is now described with reference to FIGS. 3A through 3G. The inclination of an inclined line segment of each of the membership functions is represented by tangent $\Theta$. The $\Theta$ is an angle between the horizontal line and the inclined line, as shown in FIGS. 3A through 3E. The grade $g_i$ can be obtained by multiplying a horizontal distance (Xi-Xo) by tangent $\Theta$. The value of $\tan\Theta$ is discretely defined by a combination of exponential $2^n$ to reduce memory size and operation speed. In this embodiment, exponents n are classified to two groups, odd exponents 1, 3 and 5; and even exponents 2, 4 and 6 as shown in FIG. 2. Therefore, both any one odd exponent and any one even exponent are separately stored in an inclination field within the multiplication rule field. The remaining 2-bit field within the multiplication rule field has selection information indicating which exponent, odd or even or both should be used for calculating an input label grade.

To start calculating the first input label grades, controller 80 requests an upper level device such CPU (not shown) to transfer input data. In response to this transfer request, input data for 8 input channels are provided on CPU bus 10 and are stored in input data register 30. Input data for the first input channel is supplied from input data register 30 to an adding input terminal of a subtracter 41 in response to read-out instruction by controller 80. This read-out instruction also cause MF-ROM 20 to output the first input label membership function.

Among the first input label membership function read out from MF-ROM 20 synchronizing with clock, bending point information (Xo) is supplied to a subtracting input terminal of subtracter 41, where the calculation of distance (Xi-Xo) is performed. The word "distance" is used herein for representing both distance magnitude only and the magnitude with polarity. The calculated distance (with polarity) is stored in a distance register 42. A carry bit indicating the polarity (positive or negative) of the distance is stored in a polarity register 43. The multiplication rule and function type code within the membership function are supplied to and stored in a multiplication rule register 53 and a type register 81, respectively.

The horizontal distance stored in register 42 is supplied to a depolarizing circuit 44 which comprises an inverter and a switch controlled by the carry bit stored in register 43. The horizontal distance is changed to its magnitude by de-polarizing circuit 44 and then supplied to both shift registers 51 and 52. In shift register 51, the distance magnitude is multiplied (shifted fight) by 1, 3 or 5 bits. In shift register 52, the distance magnitude is multiplied (shifted fight) by 2, 4 or 6 bits. Then these two shifted distance magnitudes are respectively supplied to each input terminal of an adder 54. Adder 54 selects either one of the shifted output from register 51 or 52, or the addition of both, depending on the selection signal from multiplication rule register 53.

As a result, multiplier elements used for multiplying the distance magnitude may be any one of three odd exponential $2^1$, $2^3$ or $2^5$, or any one of three even exponential $2^2$, $2^4$ or $2^6$, or any one of nine combinations of any one of the odd exponentials and any one of the even exponentials. That is, the multiplier may have any one of 15 values: 2, 4, 6, 8, 12, 16, 18, 24, 32, 36, 48, 64, 66, 72 and 96.

The multiplied distance ($g_{md}$) means a value ($g_{max} - g_i$). When the multiplied distance $g_{md}$ exceeds the maximum height ($g_{max} - g_{min}$), a carry bit is provided from shift register 51 or 52 or adder 54. It is easily realized by approximating the upper limit $g_{max}$ by the maximum value (FF)H of 8-bit data. The lower limit $g_{min}$ corresponds to the minimum (00)$_H$. This carry bit is stored in a carry register 67 through an OR gate 66.

In an output selection circuit subsequent multiplication circuit 50, a complement calculator 61 subtracts the multiplied distance ($g_{md}$) from the upper limit $g_{max}$ stored in a register 62 to get a grade $g_i$ of the inclined line and then supply it to a grade register 63.

According to the combination of the function type code from register 81, the polarity of the horizontal distance from register 43 and the carry bit from register 67, controller 80 sends a selection instruction signal to a selector 68 to cause it to select adequate one of the calculated grade $g_i$ stored in register 63, the upper limit $g_{max}$ stored in a register 64 or the lower limit $g_{min}$ stored in a register 65.

If a currently processed membership function is Z type and the carry bit from register 43 indicates negative polarity, selector 68 selects the upper limit $g_{max}$ as an input label grade (See FIG. 3B). If a currently processed membership function is S type and the carry bit from register 43 indicates positive polarity, selector 68 selects the upper limit $g_{max}$ as an input label grade (See FIG. 3E). If a currently processed membership function is $\Delta$ type and a horizontal distance is zero, selector 68 may selects the upper limit $g_{max}$ as an input label grade (See FIG. 3A). Selector 68 selects the lower limit $g_{min}$ in any one of the three cases: when a currently processed membership function is Z type and a horizontal distance is positive, when a membership function is S type and a horizontal distance is negative, and when a membership function is $\Delta$ type, a horizontal distance is not zero and the carry bit from register 67 indicates that a multiplied distance $g_{md}$ exceeds the maximum height ($g_{max} - g_{min}$). Otherwise, selector 68 selects the calculated grade gi.

If a currently processed membership function is $\Delta$, Z or S type, a selector 71 selects the output from selector 68 and supply it onto a grade bus 90.

The operation of the grade calculating circuit of this embodiment for the $\pi$ type function is now explained. If a currently processed function is $\pi$, a first grade $g_i$ calculated for Z type function is first stored in a preceding register 72, and then a next grade $g_i'$ calculated for S type function is supplied to a minimum value circuit 73. Minimum value circuit 73 selects a smaller one of the grades $g_i$ and $g_i'$ and output it to selector 71. Selector 71 selects the output from circuit 73 and output it onto grade bus 90 under control of controller 80.

In this manner, by selecting a smaller one of the grade $g_i$ of Z type function and the grade $g_i'$ of S type function, a grade of $\pi$ type function is obtained as seen from FIG. 3C–E. Because the inclinations $\Theta$s for Z and S type functions can be different from each other, asymmetric $\pi$ function can be defined.

In the embodiment shown in FIG. 3C–E, if an input data Xi has a relationship Xo'<Xi<Xo, the calculated grades $g_i$ and $g_i'$ for Z and S types are both $g_{max}$, and therefore $g_{max}$ is selected as an input label grade for $\pi$ type function. If Xo<Xi, the grade $g_i'$ for S type is $g_{max}$, and therefore the smaller grade $g_i$ for Z type is selected. If Xi<Xo', the grade $g_i$ for Z type is $g_{max}$, and therefore the smaller grade $g_i'$ for S type is selected.

Synchronizing with outputting the calculated grade onto grade bus 90, controller 80 provide an input label code onto a label bus 91. The label code identifies an input label which is associated with a current grade on bus 90. In case of outputting the minimum grade $g_{min}$ onto bus 90, controller 80 may provide an invalid flag onto a signal line 92 in order that the subsequent stage can identify the minimum grade (00)H as an invalid data.

After the distance calculation is completed for the first input label, controller 80 causes MF-ROM 20 to send out the next input label membership function and starts calculating the horizontal distance for the next function. After the last input label is processed with regard to the first input data, controller 80 causes input data register to send out the next input data to start calculating on the next data.

Distance calculating circuit 40, distance multiplication circuit 50 and output selection circuit 60, which are cascaded as shown in FIG. 1, sequentially process input labels outputted one by one from MF-ROM 20 at the speed of one label per one clock cycle. Therefore three clocks after reading of the first input label from MF-ROM, calculated grades are sequentially outputted onto grade bus 90 with speed of one grade per one clock cycle. However, the calculation of a grade for $\pi$ function needs one more clock. In this manner, high speed operation as fast as table ROM methods can be obtained without requiring large memory.

As described above, output selection circuit 70 outputs the maximum grade $g_{max}$ and the minimum grade $g_{min}$ as well as the calculated grade $g_i$ onto bus 90. However, instead of these maximum and minimum values, special flags may be used, which indicate the grade value is (FF)$_H$ or (00)$_H$. The subsequent circuits may take special procedures in response to such flags.

While the present invention has been shown and described with reference to a particular embodiment thereof, various modifications and changes thereto will be apparent to one skilled in the art and are within the spirit and scope of the present invention.

We claim:

1. An all-digital grade calculating circuit for use in a fuzzy inference system, comprising:

a) input means for receiving a digital data input value representing an unfuzzified input;

b) a first memory having a plurality of storage locations for storing a plurality of digital membership functions, each of the plurality of storage locations contains a one of the plurality of digital membership functions, each digital membership function comprises:

i) a first bit field representing a bending point of the digital membership function;

ii) a second bit field representing a multiplication rule of the digital membership function; and iii) a third bit field representing a type code of the digital membership function;

c) first accessing means for accessing the first memory to retrieve a one of the plurality of digital membership functions;

d) digital subtraction circuit means having a first input coupled to receive the digital data input value from the input means and a second input coupled to receive the first bit field of the one of the plurality of digital membership functions retrieved from the first accessing means, the digital subtraction circuit means outputting a digital distance value output that is equal to the difference between data values presented to the first and second inputs of the subtraction circuit means;

e) first digital shifter circuit means having a first input coupled to receive the digital distance value from the digital subtraction circuit means and having a second input coupled to receive the second bit field of the one of the plurality of digital membership functions retrieved from the first accessing means, the first digital shifter circuit means outputting a multiplied digital distance value output that is equal to the digital distance value shifted by an amount specified by the second bit field of the retrieved digital membership function; and f) selection means coupled to receive the multiplied digital distance value and having an input for receiving the third bit field of the one of the plurality of digital membership functions retrieved from the first accessing means, the selection means selecting a, digital grade output that is equal to one of the multiplied digital distance value, a predetermined maximum digital grade and a predetermined minimum digital grade under control of the third bit field.

2. The all-digital grade calculating circuit according to claim 1 further comprising:

second digital shifter circuit means having a first input coupled to receive the digital distance value from the digital subtraction circuit means and having a second input coupled to receive the second bit field of the one of the plurality of digital membership functions retrieved from the first accessing means, the second digital shifter circuit means outputting a second multiplied digital distance value output that is equal to the digital distance value shifted by an amount specified by the second bit field of the one of the plurality of digital membership functions retrieved from the first accessing means, an amount of shift applied to the digital distance value by the second digital shifter circuit means is different from the amount of shift applied to the digital distance value by the digital shifter circuit means; and combiner means having inputs coupled to receive the multiplied digital distance value from the first digital shifter circuit means and to receive the second multiplied digital distance value from the second digital shifter circuit means and to receive the second bit field of the one of the plurality of digital membership functions retrieved from the first accessing means, the combiner means combining, under control of the second bit field of the one of the plurality of digital membership functions retrieved from the first accessing means, one of the multiplied digital distance value, the second multiplied digital distance value and an arithmetic combination of the multiplied digital distance value and the second multiplied digital distance value to the selection means.

3. The all-digital grade calculating circuit according to claim 2 wherein:

the first digital shifter circuit means is for shifting the digital distance value by one of a first predetermined set of shift amounts; and the second digital shifter circuit means is for shifting the digital distance value by one of a second predetermined set of shift amounts, the first and second predetermined sets of shift amounts having no shift amounts in common.

4. The all-digital grade calculating circuit according to claim 3 wherein the combiner means further comprises:

adder means for adding the multiplied digital distance value and the second multiplied digital distance value.

* * * * *